United States Patent Office 3,463,396
Patented Aug. 26, 1969

1

3,463,396
TEMPERATURE-CONTROLLED SPRAYER APPARATUS
George Borel, Bennekom, Netherlands, assignor, by mesne assignments, to Plessey Fabrieken N.V., The Hague, Netherlands, a corporation of the Netherlands
Filed Aug. 22, 1967, Ser. No. 662,521
Claims priority, application Netherlands, Aug. 26, 1966, 6612025
Int. Cl. B05b 17/04; F16k 17/38; G04c 23/10
U.S. Cl. 239—70                                7 Claims

ABSTRACT OF THE DISCLOSURE

The invention relates to a sprayer apparatus for spraying slips and plants with water, the duration of the spraying time and of the pauses between sprayings being exclusively determined by the environmental temperature.

---

Figure 1:
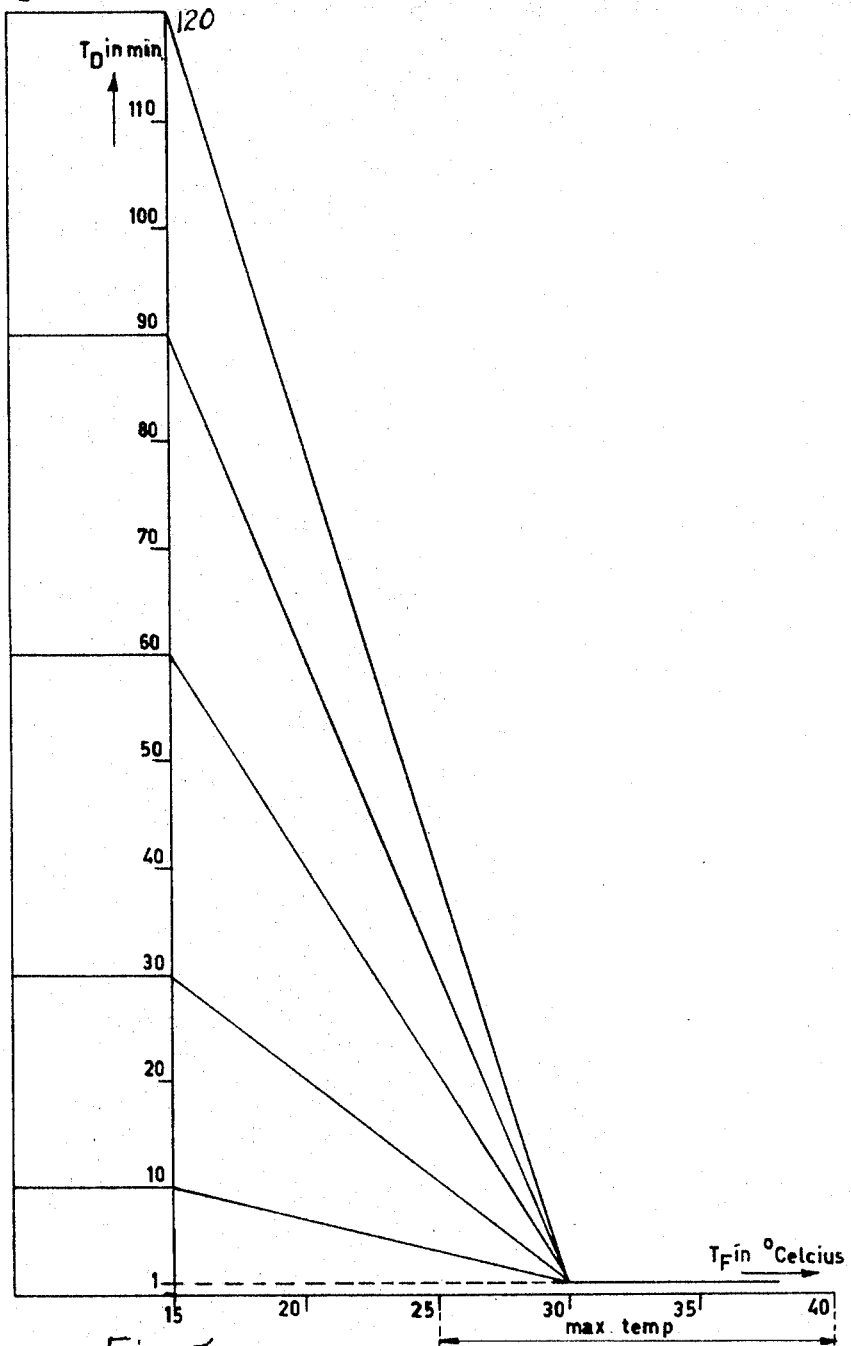
Figure 2:
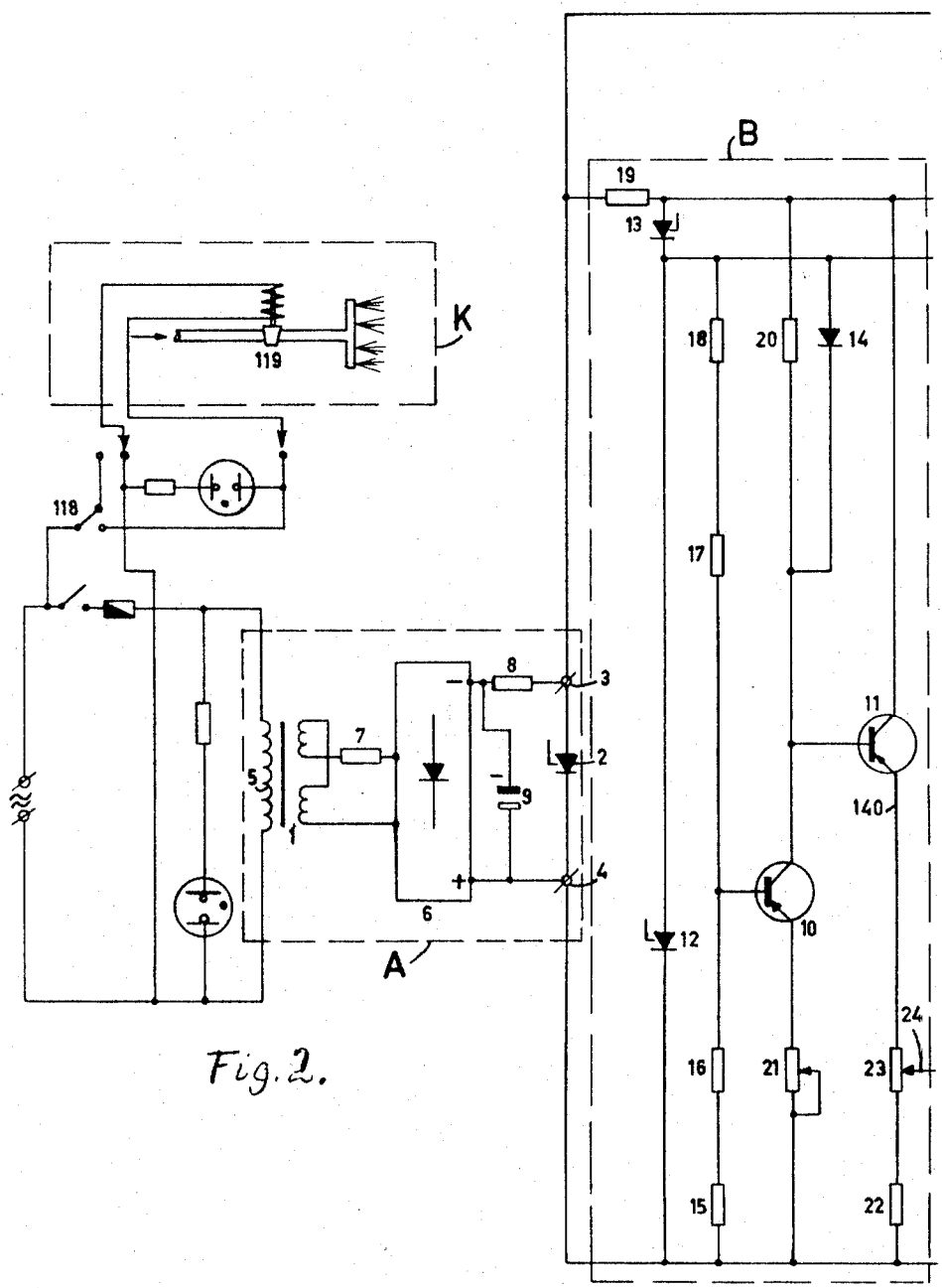
Figure 3:
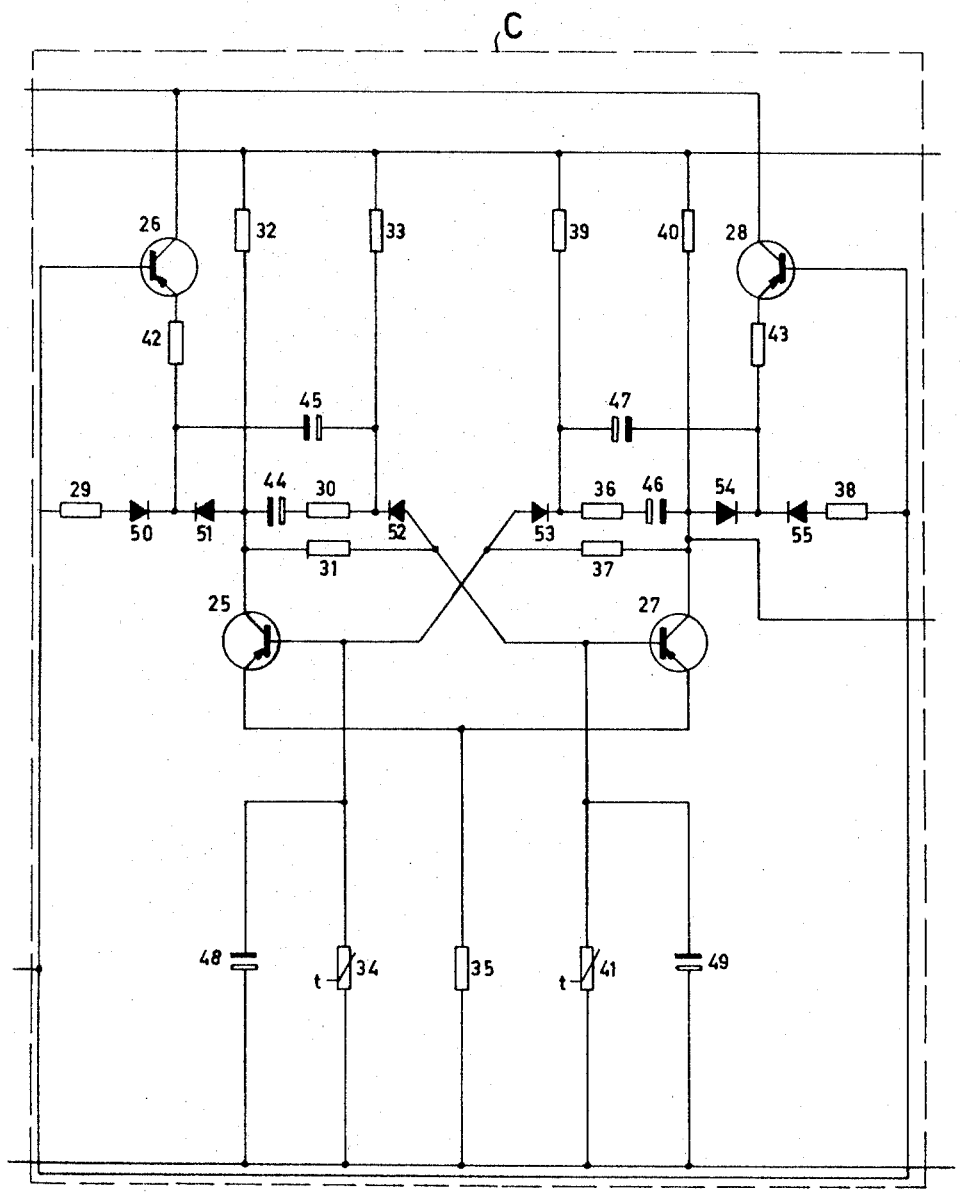
Figure 4:
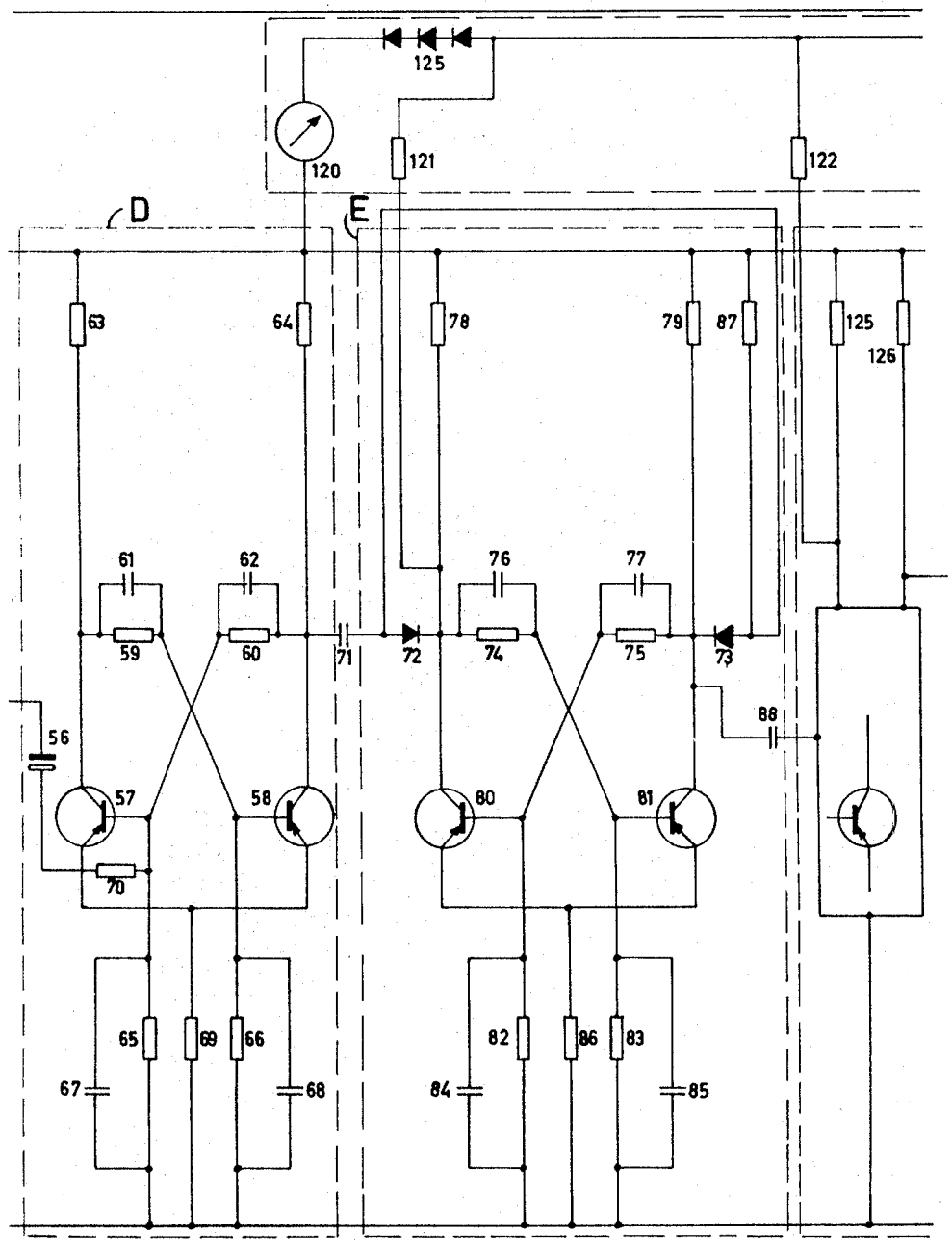
Figure 5:
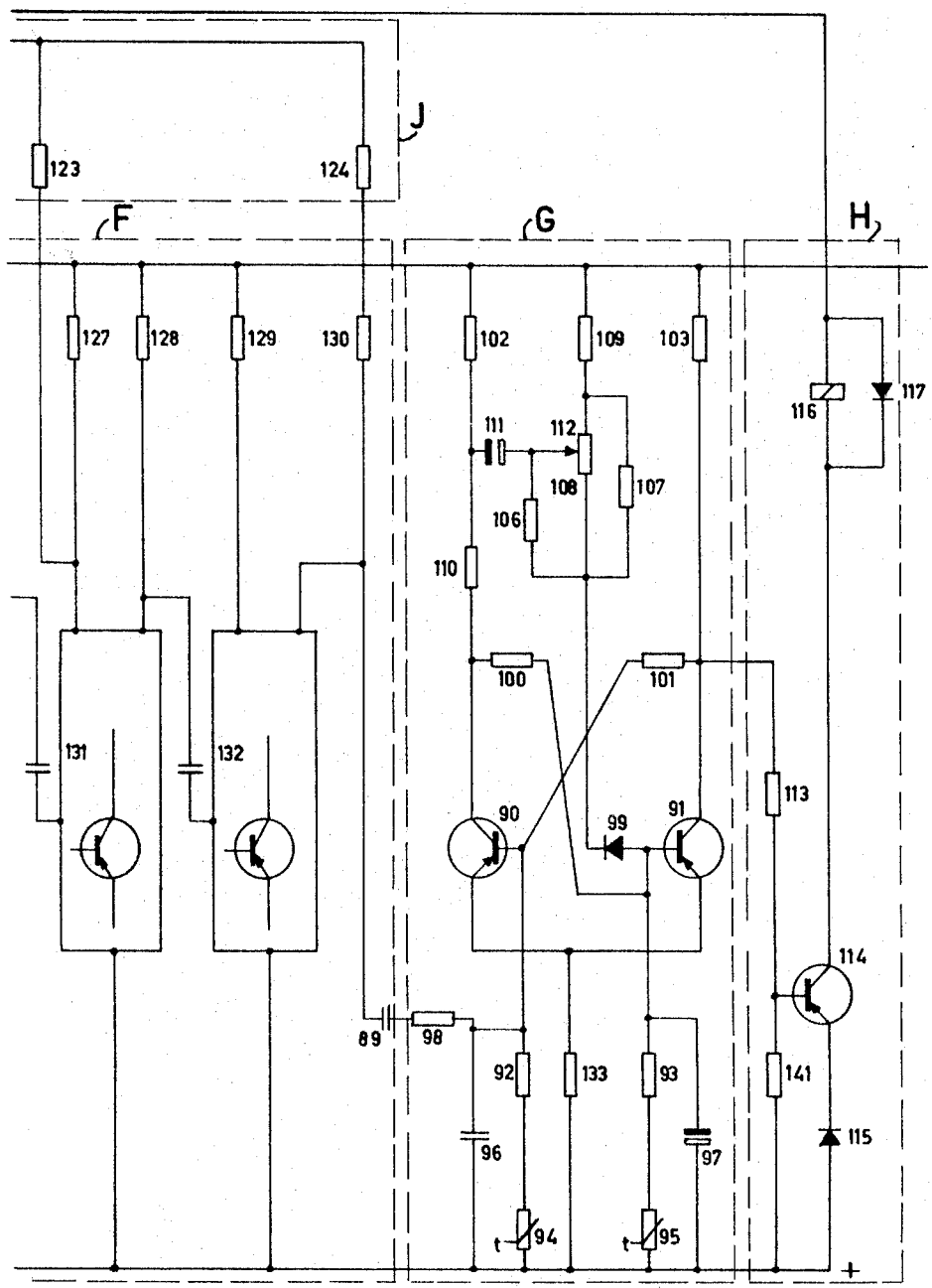

The present invention relates to an apparatus provided with a temperature bulb, an astable multivibrator which can be automatically controlled in frequency by the bulb and an element controlled by the multivibrator. Such an apparatus is known in the form of a temperature meter. This temperature meter comprises an indicator element, which reacts by a deflection proportional to the frequency of the output signal of the multivibrator and is provided with a scale calibrated in degrees of temperature.

The distinguishing feature of the present invention is that the apparatus is a spraying apparatus and that its element is a valve in the spraying liquid pipe and that the astable multivibrator operates the valve via a monostable multivibrator, the resetting time of which, which is adjustable by hand, determines the spraying time.

The current view is that the amount of water required for a plant or a slip is dependent on diverse circumstances such as: the relative moisture of the air, the atmospheric pressure, the colour, shape and surface condition of the leaf, etc.

In order to fulfill these requirements, an artificial leaf was developed as a bulb for the above-mentioned circumstances, which was positioned among the leaves and which operated a valve in a liquid pipe by means of a controller apparatus. This artificial leaf was extremely vulnerable and appeared to be insufficiently adaptable to circumstances.

It has been found that the plants' need of water can always be satisfied, if a certain determined connection between the amount of water to be sprayed and exclusively the temperature is observed.

As a matter of fact, the need of plants for water is small when the temperature is low, but strongly increases as the temperature rises.

This requirement can be met by using an astable multivibrator which being controlled by the temperature bulb over a small temperature trajectory shows a particularly great change in the frequency excited.

The invention is illustrated on the accompanying drawings relating to an apparatus as a spraying device controlled by the circuits illustrated in the drawings in which:

FIG. 1 is a diagram showing as a graph the drying time as a function of the bulb temperature; and FIGS. 2–5 are circuit diagrams to illustrate the various stages for the operation of the sprayer apparatus.

The invention will now be further elucidated with reference to a diagram of an embodiment of the invention and an accompanying idealized graph of the drying time

2

$T_D$ (this being the time between two sprayings) as a function of the bulb temperature $T_F$.

In the diagram, the supply A comprising the transformer 1 the resistors 7 and 8 the condenser 9 the bridge rectifier 6 and the Zener diode 2 is connected to the main by means of the winding 5.

The output voltage on the terminals 3 and 4 has been stabilized at 18 volts with the aid of the Zener diode 2.

The first stage B of the sprayer apparatus consisting of the transistors 10 and 11, the Zener diodes 12 and 13, the diode 14 and the resistors 15 to 23 inclusive, emits an output signal to the sliding contact 24 on the resistor 23, the said output signal having a desired relation to the temperature measured by the transistor temperature bulb 10.

The temperature for which the desired maximum collector current occurs—the collector-emitter voltage for that temperature then being at its minimum—can be adjusted with a resistor 21. At this or at a higher temperature, the astable multivibrator circuit C, which is connected to the first stage B, will oscillate in the highest frequency within its range.

When a lower temperature is measured by the bulb 10, the same adjustment of the resistor 21 will result in a lower frequency oscillation of the circuit C.

The emitter 140 of the emitter follower 11 follows the collector voltage of the bulb 10, the said voltage changing according to the temperature measured.

Thus on the resistors 22 and 23 a voltage arises, which varies with the temperature, and part of which can be taken off by means of the sliding contact 24 which controls the circuit C.

The minimum frequency at which the circuit C oscillates is fixed by the adjustment of the proportion between the total voltage on the resistors 22 and 23 and the part of it which is taken off from the voltage.

We would observe right now that the periodical time of the excited frequency is a measure for the drying time. A high frequency results in a short drying time and a low frequency will result in a long drying time, whilst the spraying time—being the time during which spraying is effected—is determined by the resetting time of the monostable multivibrator in block G.

The multivibrator circuit C comprising the transistors 25 to 28 inclusive, the resistors 29 to 43 inclusive, the condensers 44 to 49 inclusive and the diodes 50 to 55 inclusive is known.

The transistors 25 and 27, the resistors 35, 33, 39, 32, 40, 31 and 37 and the condensers 44 and 46 together form a conventional multivibrator circuit.

For purposes of temperature compensation, the resistors 34 and 41 are provided, which are bridged over by the condensers 48 and 49.

The silicone diodes 52 and 53 have been provided in order to prevent the charge of the condensers 44, 46, 45, 47 from leaking away by way of the basis collector circuits of the transistors 25 and 27 during the discharging periods.

The resistor 30 forms a voltage divider together with the resistor 33. In the same way, the resistor 36 forms a voltage divider with the resistor 39. By changing the proportion of the resistors (30 and 33) and/or (36 and 39), the discharging time of the condenser 44 and/or 46 is changed and with it the highest frequency which is generated by the circuit.

The bases of the emitter followers 26 and 28 are connected to the sliding contact 24.

The emitters of the followers 26 and 28 follow the potential of the contact 24.

As long as the potential of the connecting point of the diodes 50, 51 and 54, 55 respectively is higher than or equal to the potential on the basis of the transistor 27 or 25 respectively during the conducting condition of the transistor 27 or 25 respectively, the multivibrator oscillates in the highest frequency it can reach.

Then the condensers 45 and 47 are not incorporated in the R-C elements which determine the oscillation frequency of the circuit.

If, during the conducting condition of the transistor 27, the potential of the connecting point of the diodes 50, 51 is lower than the potential of the basis of this transistor 27, the condenser 45 is indeed incorporated in the aforesaid R-C elements.

In the same way, the condenser 47 is incorporated in the aforesaid R-C elements, if the potential of the connecting point of the diodes 54, 55 during the conducting condition of the transistor 25 is lower than the potential of the basis of the transistor 25.

In these cases, the diodes 51 and 54 are conductive and the lower the potential on the aforesaid points of connections 50, 51 and 54, 55 can be momentarily made, the more the condensers 45 and 47 come to belong to the R-C elements and the lower the oscillation frequency of the multivibrator can be made.

The emitter followers 26 and 28, the bases of which are connected with the sliding contact 24, which has a potential that varies with the temperature measured, provide the potential control of the aforesaid points of connection 50, 51 and 54, 55. The circuit C controls a bistable multivibrator D via the condenser 56, which multivibrator D turns the signal emitted by the circuit C into a substantially purely block-shaped signal of equal frequency.

The circuit D is not considered here because it does not show any special particularities.

Via the condenser 71, the circuit D controls a conventional binary unit counter E, which turns the signal emitted by the circuit D into a signal having half its frequency.

In block F is shown a diagram of a cascade of three binary unit counters of the type E, so that the signal which reaches the monostable multivibrator G via the condenser 89 has had its frequency divided 16 times.

The monostable vibrator G is also of the conventional type. The resetting time of the vibrator G is adjusted by means of the slider 112 on the resistor 108.

The resetting time, i.e., the time during which the vibrator G is in the astable condition, determines the spraying time during which the valve 119 in block K is open.

The amplificator-transistor stage in the block H is provided with a transistor 114, in which collector circuit the relay coil 116 provided with the contact 118 is incorporated.

In the block I is incorporated a meter 120 comprising a diode 125 and the resistors 121 to 124 inclusive, which meter shows the condition of the binary unit counters from the blocks E and F, from which, between two sprayings, it can be concluded when a new spraying time is to begin.

In the graph belonging to the embodiment of the invention, the maximum temperature is indicated with 30° centigrade. This maximum temperature can be adjusted by means of the resistor 21 within a range between 25° and 40° centigrade.

At the adjusted maximum temperature or a higher temperature than that, the drying time is always 1 minute.

The gradient indicating the increase of the drying time at a lower temperature, can be adjusted with the contact 24 on the resistor 23. Below 15° centigrade the drying time does not increase any further. The boundaries of 10 minutes and 120 minutes, between which the drying time can be adjusted at 15° centigrade, determine the boundaries of the control frequency range of the multivibrator in the block C.

The spraying time, which is adjustable by means of the contact 112 on the resistor 108 is adjustable between 1½ and 20 seconds.

This time somewhat affects the drying time, but this fact has not been taken into account in the idealized graph.

The following is a list of the values of the elements of the embodiment of the invention described in the foregoing.

Resistors:
| | |
|---|---|
| 7, 69, 86 | 1,500 ohms. |
| 8 | 330 ohms. |
| 15 | 47 ohms. |
| 16 | 27 ohms. |
| 17 | 820 ohms. |
| 18 | 6,800 ohms. |
| 19 | 180 ohms. |
| 20, 42, 43, 113, 123 | 27,000 ohms. |
| 22 | 2,200 ohms. |
| 29, 38, 93, 102, 103 | 8,200 ohms. |
| 30, 36, 70, 92, 124 | 10,000 ohms. |
| 31, 37 | 390,000 ohms. |
| 32, 40, 65, 66, 82, 83, 83, 141, 109 | 15,000 ohms. |
| 33, 39 | 180,000 ohms. |
| 35 | 390 ohms. |
| 63, 64, 78, 79, 126, 128, 129 | 18,000 ohms. |
| 59, 60, 74, 75, 106 | 47,000 ohms. |
| 98, 127 | 39,000 ohms. |
| 100 | 220,000 ohms. |
| 101 | 82,000 ohms. |
| 107 | 390,000 ohms. |
| 110 | 470 ohms. |
| 121 | 100,000 ohms. |
| 122 | 56,000 ohms. |
| 125 | 22,000 ohms. |
| 130 | 1,000 ohms. |
| 34, 41, 94, 95 | 10,000 ohms N.T.C. |
| 21 | 100 ohms potentiometer. |
| 23 | 10,000 ohms potentiometer. |
| 108 | 220,000 ohms potentiometer log. |

Condensers:
| | |
|---|---|
| 9 | 100 micro farads (30 volts). |
| 44, 46 | 10 micro farads. |
| 45, 47 | 1,000 micro farads. |
| 48, 49 | 40 micro farads (16 volts). |
| 56 | 25 micro farads. |
| 61, 62, 76, 77 | 1,000 micro micro farads. |
| 67, 68, 84, 85 | 270 micro micro farads. |
| 71, 88, 131, 132 | 1,500 micro micro farads. |
| 89 | 18,000 micro micro farads. |
| 96 | 680 micro micro farads. |
| 97 | 32 micro farads. |
| 111 | 130 micro farads. |

Transistors:
| | |
|---|---|
| 10, 25, 27, 90, 91, 114 | S.F.T. 353 Cosem. |
| 11 | OC. 467. |
| 80, 81 | S.F.T. 351 Cosem. |

Diodes:
| | |
|---|---|
| 6 | B30 C250. |
| 2 | Z. 18. |
| 13 | Q.Z. 6, 8. |
| 12 | Q.Z. 8, 2. |
| 14, 50, 51, 52, 53, 54, 55, 99, 115, 125 | SG 1243. |
| 72, 73, 117 | SFD 108. |

Transformator 1 — Primary 220 volts, secondary 24 volts.

Meter 120 — 1 milliampere.

Relay 116 — Coil 2,500 ohms.

I claim:
1. A spraying apparatus comprising a temperature bulb, an astable multivibrator which can be automatically controlled in frequency by the bulb and an element controlled by the multivibrator, said element being a valve in a spraying liquid pipe and the astable multivibrator operates the valve by a monostable multivibrator, the resetting time of which, which is adjustable manually, determining the spraying time.

2. A spraying apparatus according to claim 1, wherein the maximum temperature, at which the maximum frequency of the astable multivibrator occurs, can be adjusted manually by changing the adjustment of the temperature bulb.

3. A spraying apparatus according to claim 1, wherein the minimum frequency of the astable multivibrator, which determines the drying time, at a minimum temperature can be adjusted manually, by delimiting the control of the astable multivibrator by the temperature bulb.

4. An apparatus according to claim 1 wherein a bistable multivibrator is connected between the astable multivibrator and the monostable multivibrator followed by at least one binary unit counter.

5. A spraying apparatus according to claim 2, wherein the minimum frequency of the astable multivibrator, which determines the drying time, as a minimum temperature can be adjusted manually, by delimiting the control of the astable multivibrator by the temperature bulb.

6. An apparatus according to claim 2, wherein a bistable multivibrator is connected between the astable multivibrator and the monostable multivibrator followed by at least one binary unit counter.

7. An apparatus according to claim 3, wherein a bistable multivibrator is connected between the astable multivibrator and the monostable multivibrator followed by at least one binary unit counter.

References Cited
UNITED STATES PATENTS 2,969,185   1/1961   Geiger _____ 239—63

EVERETT W. KIRBY, Primary Examiner

U.S. Cl. X.R.

137—78; 239—63